US005876087A

United States Patent [19]

Kleefeldt et al.

[11] Patent Number: 5,876,087

[45] Date of Patent: Mar. 2, 1999

[54] MOTOR-VEHICLE SLIDING-DOOR SYSTEM

[75] Inventors: Frank Kleefeldt, Heiligenhaus; Damien Labonde, Essen; Johannes-Theodor Menke, Velbert; Stefan Armbruster, Heiligenhaus; Thomas Schönenberg, Leverkusen, all of Germany

[73] Assignee: Kiekert AG, Heiligenhaus, Germany

[21] Appl. No.: 831,981

[22] Filed: Apr. 2, 1997

[30] Foreign Application Priority Data

| | | | |
|---|---|---|---|
| Apr. 2, 1996 | [DE] | Germany | 196 13 114.6 |
| Apr. 2, 1996 | [DE] | Germany | 196 13 116.2 |
| Jun. 1, 1996 | [DE] | Germany | 296 09 770 U |
| Jan. 25, 1997 | [DE] | Germany | 197 02 698.2 |
| Feb. 19, 1997 | [DE] | Germany | 197 06 393.4 |

[51] Int. Cl.$^{6}$ .......... B60J 5/04

[52] U.S. Cl. .......... 296/155; 49/280; 49/360

[58] Field of Search .......... 296/155; 49/280, 49/360

[56] References Cited

U.S. PATENT DOCUMENTS

| | | | |
|---|---|---|---|
| 4,842,313 | 6/1989 | Broyko et al. | 296/155 |
| 4,956,939 | 9/1990 | Kuhlman | 49/280 |
| 5,063,710 | 11/1991 | Schap | 49/362 |
| 5,140,316 | 8/1992 | DeLand | 296/155 X |
| 5,217,266 | 6/1993 | Kostler | 49/280 |
| 5,316,365 | 5/1994 | Kuhlman | 296/155 |

FOREIGN PATENT DOCUMENTS

| | | | |
|---|---|---|---|
| 2227280 | 7/1990 | United Kingdom | 49/360 |

*Primary Examiner*—Dennis H. Pedder
*Attorney, Agent, or Firm*—Herbert Dubno; Andrew Wilford

[57] ABSTRACT

A motor vehicle has a body provided with at least one generally horizontal rail having a bent end portion and along which a sliding door is displaceable between a closed position in against the body and an open position out from the body. A sliding-door assembly has a door drive on the body including a flexible toothed belt extending along the rail and having an end and a link assembly fixed to the door, riding along the rail, connected to the belt end, and engaged in the bent end portion of the rail in the closed position of the door. A guide extends along the rail and laterally confines the belt so an actuator on the body can displacing the belt in one sense and thereby tension the belt and move the door in one direction and displace the belt in the opposite sense and thereby longitudinally compress the belt and move the door in the opposite direction. A door latch on the door and a keeper on the body communicating therewith secure the door tightly to the body in the closed position of the door and a closed position of the latch and release the door to ride along the rail in an open position of the latch. A controller connected between the door latch and the door actuator operates the actuator to move the door into the respective open position on displacement of the latch into the respective open position.

8 Claims, 12 Drawing Sheets

MOTOR-VEHICLE SLIDING-DOOR SYSTEM

FIELD OF THE INVENTION

The present invention relates to a sliding-door system for use in a motor vehicle. More particularly this invention concerns such a sliding-door system which is used on the side of a van or the like and which can be operated manually or with a power assist.

BACKGROUND OF THE INVENTION

A standard motor vehicle has a body provided with at least one generally horizontal rail having a bent end portion and along which a sliding door is displaceable between a closed position in against the body and an open position out from the body. Such a sliding-door assembly is typically provided on minivans intended for passenger use as the back doors, as they allow the passengers in and out of the vehicle through a large opening yet, since the door even when open is relatively close to the vehicle, the vehicle can be relative close to other vehicles or structures while still allowing back-door access.

Normally as the door is opened it moves first outward somewhat, then back along the side of the vehicle. When closed it slides forward and, at the end of its travel, moves inward to fit flush with the vehicle side. To this end the tracks normally have bent-in front ends in which carriages fixed to the door ride.

To prevent air leaks it is essential that the door be closed very tight. Thus its peripheral seal is compressed all around the door. In a manual system this means that the door must be pushed to with considerable force. In a power-closing and-opening system such as described in U.S. Pat. Nos. 5,140,316 and 5,316,365 it therefore becomes necessary to provide a fairly robust closing system to bring the necessary force to bear. For opening there is little problem, as once the latch is released the door pops out as the seal decompresses, but for closing it is necessary to bring enough force to bear that the seal can be compressed all around the door.

Thus these systems use an annular loop of cable that is operated wholly in tension by means of a relatively powerful motor so that it can bring the necessary force to bear. Alternately two different cables are used, one for opening and one for closing, and once again the cables are only effective in tension. During opening one of the cables is passive and during closing the other is passive.

OBJECTS OF THE INVENTION

It is therefore an object of the present invention to provide an improved sliding-door assembly for a motor vehicle.

Another object is the provision of such an improved sliding-door assembly for a motor vehicle which overcomes the above-given disadvantages, that is which is of relative simple construction but which nonetheless closes the door tightly.

SUMMARY OF THE INVENTION

A motor vehicle has a body provided with at least one generally horizontal rail having a bent end portion and along which a sliding door is displaceable between a closed position in against the body and an open position out from the body. A sliding-door assembly has according to the invention a door drive on the body including a flexible toothed belt extending along the rail and having an end and a link assembly fixed to the door, riding along the rail, connected to the belt end, and engaged in the bent end portion of the rail in the closed position of the door. A guide extends along the rail and laterally confines the belt so an actuator on the body can displacing the belt in one sense and thereby tension the belt and move the door in one direction and displace the belt in the opposite sense and thereby longitudinally compress the belt and move the door in the opposite direction. A door latch on the door and a keeper on the body communicating therewith secure the door tightly to the body in the closed position of the door and a closed position of the latch and release the door to ride along the rail in an open position of the latch. A controller connected between the door latch and the door actuator operates the actuator to move the door into the respective open position on displacement of the latch into the respective open position.

According to the invention the vehicle has an upper rail, a lower rail, and a middle rail therebetween. The belt extends along the middle rail. In addition the actuator includes a rotating toothed drive pulley over which the belt is spanned.

For wholly manual operation of the door a remotely operable coupling is provided between the link assembly and the belt displaceable between a coupling position securing the belt to the link assembly and a decoupling position freeing the belt from the link assembly.

The door latch in accordance with the invention the keeper on the body is provided with an actuator for displacing it transversely of the rail and thereby pulling the door tightly against the vehicle.

The controller according to the invention is mounted on the body and connected via wiring to the actuator means. In addition the controller includes another controller mounted in the door and connected via wiring to the door latch. Alternately the controller mounted on the body and the controller mounted in the door communicate via a radio link at least in the open position of the door.

The system of this invention is extremely simple to build and operate. It can be quite compact and the belt can be quite effective both in compression and tension. As a result the system can be made relatively inexpensively. As a result of the mainly straight path for the belt, it can be counted on to work effectively. Since the latch itself is set to exert the considerable force for the last stages of closing, the door-opening mechanism need not be built robustly enough to do this job. As a result the opening and closing movement can be quite fast and very quiet. Since the door latch itself is used to trip the actuator responsible for opening and closing the door, operation of the door is natural. The user need merely operate the handle as on a conventional manually operated door, and the power assist automatically takes over. The system is set up, however, so that if the power assist fails, the door handle can decouple the belt and operate the latch manually.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
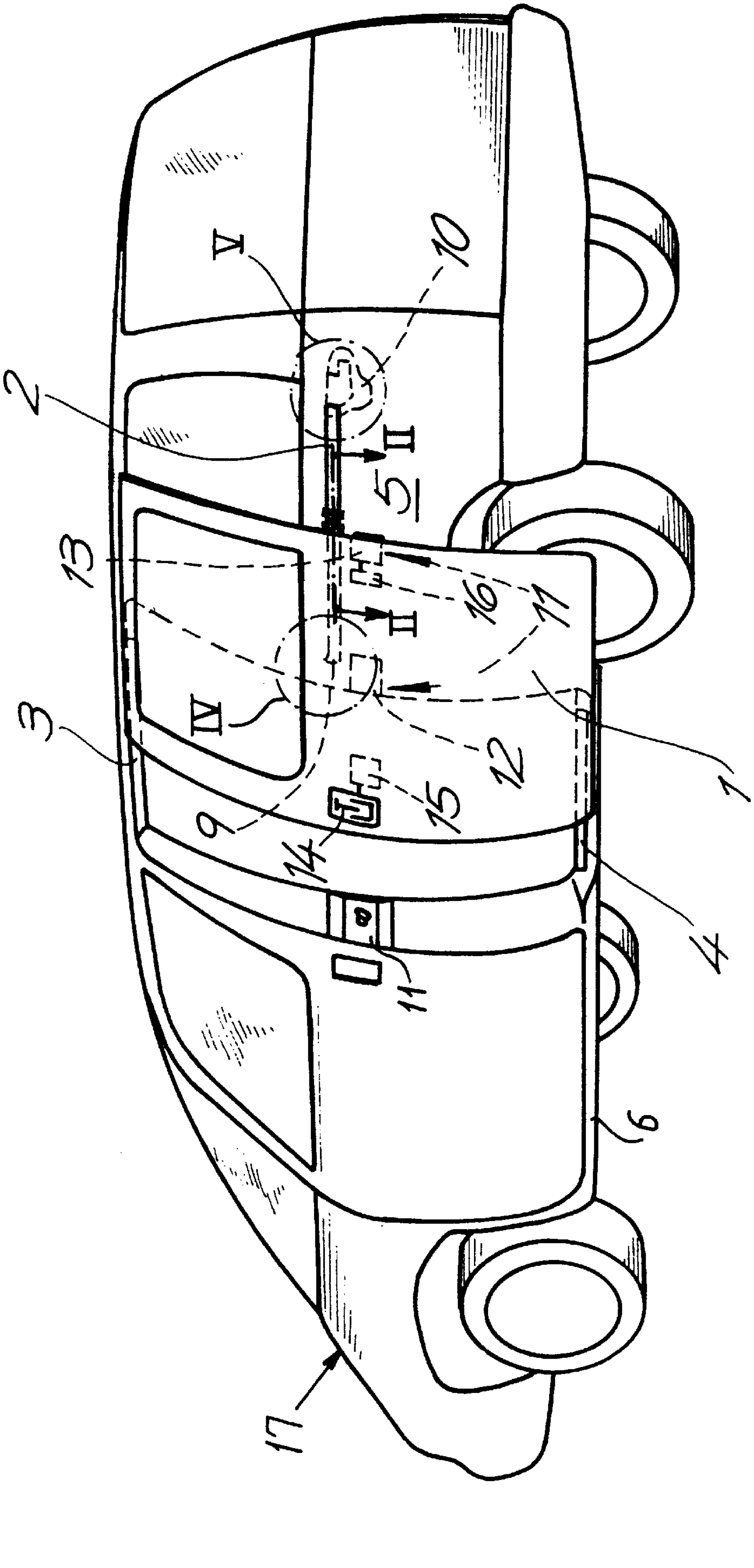
FIG. 1 is a partly schematic view of a motor vehicle equipped with a door system according to the invention.

As seen in FIG. 1 a motor vehicle 17, here a minivan, has a side wall 5 provided with a central rail 2, an upper rail 3, and a lower rail 4 supporting a horizontally slidable side door 1. This door 1 has a front control latch 15 operated by a manually actuatable outside handle assembly 14 and an inside handle assembly 34 (FIG. 12 only) and coacting with a strike 11 mounted on a body 6 of the vehicle 17. It also has a rear door-mounted latch 13 coacting with a body-mounted latch or strike assembly 12 and operated by a servo 16. A door actuator 10 mounted in the vehicle 17 can shift the door 1 between its end positions.

Figure 2:
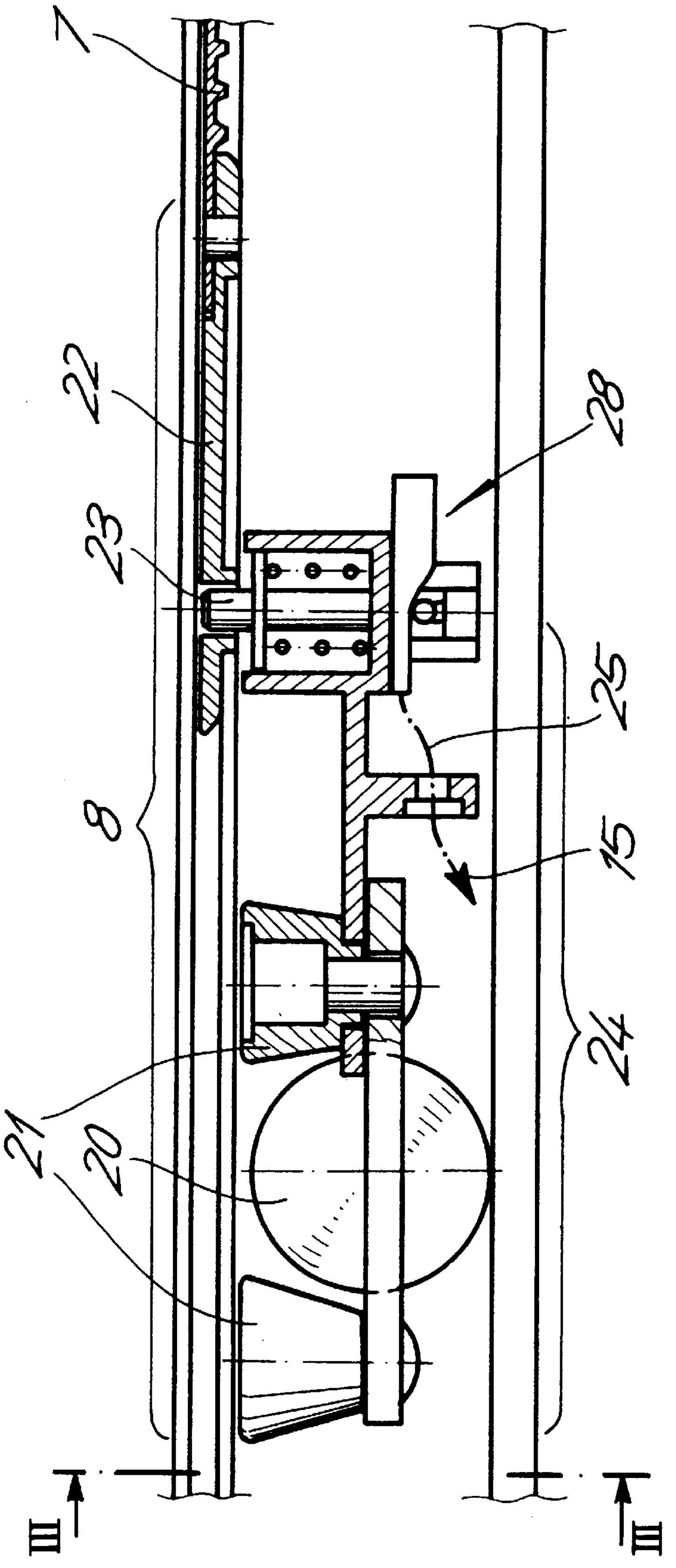
FIG. 2 is a horizontal section taken along line II—II of FIG. 1.
Figure 3:
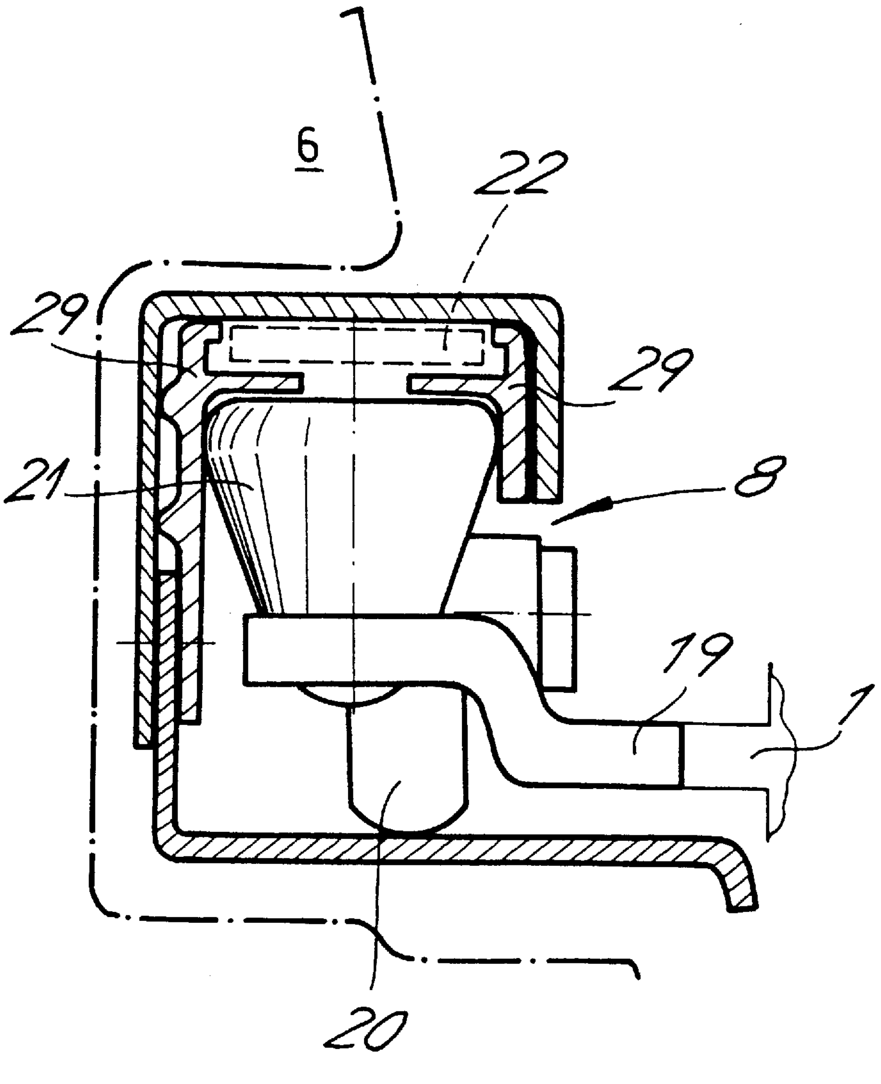
FIG. 3 is a vertical section taken along line III—III of FIG. 2.
Figure 4:
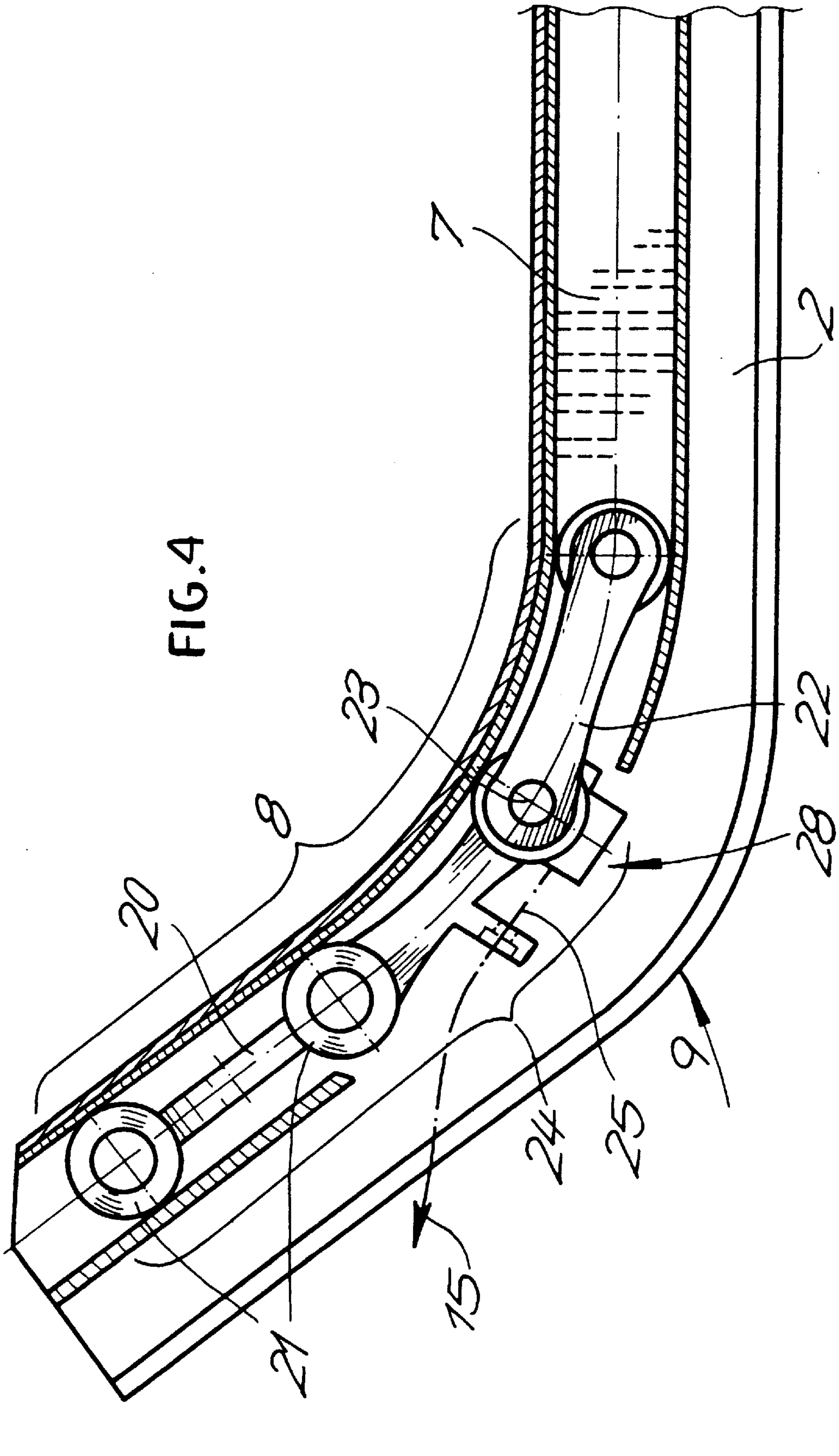
FIGS. 4 and 5 are horizontal sections taken through the details indicated respectively at IV and V in FIG. 1.

FIGS. 2, 3, and 4 show how a toothed belt 7 has one unillustrated end secured to the door 1 and an opposite end connected to an end link 22 of a link assembly 8 that rides in the middle rail 2 and that, in the closed position of the door shown in FIG. 4 sits in a curved portion 9 of this track 2. The belt 7 is largely surrounded by a guide so that it can be effective both in longitudinal compression and in traction, that is to push and pull the door 1. The door 1 has struts or mounts 19 on which are mounted carriages 24 having rollers 21 rotatable about vertical axes in the rails 2 through 4 and rollers 20 that rotate about horizontal axes. The tracks 2 through 4 are mainly straight, but angled at the ends so that as the door 1 moves from the closed to the open position it moves first out crosswise of the vehicle travel direction, and then parallel to this direction and when closed it moves in at the end of its travel.

A coupling 28 is provided between the rear carriage 24 of the middle rail 2 and the end link 22. It is constituted as a spring-loaded pin 23 that normally engages in a transversely throughgoing hole of the end link 22 and that can be retracted by a wedge 28 operated via a bowden cable 25 from the front control latch 15. As described below, the function of this coupling 28 is to allow manual operation of the door 1 when for some reason the electrically powered closing and opening system fails.

Figure 5:
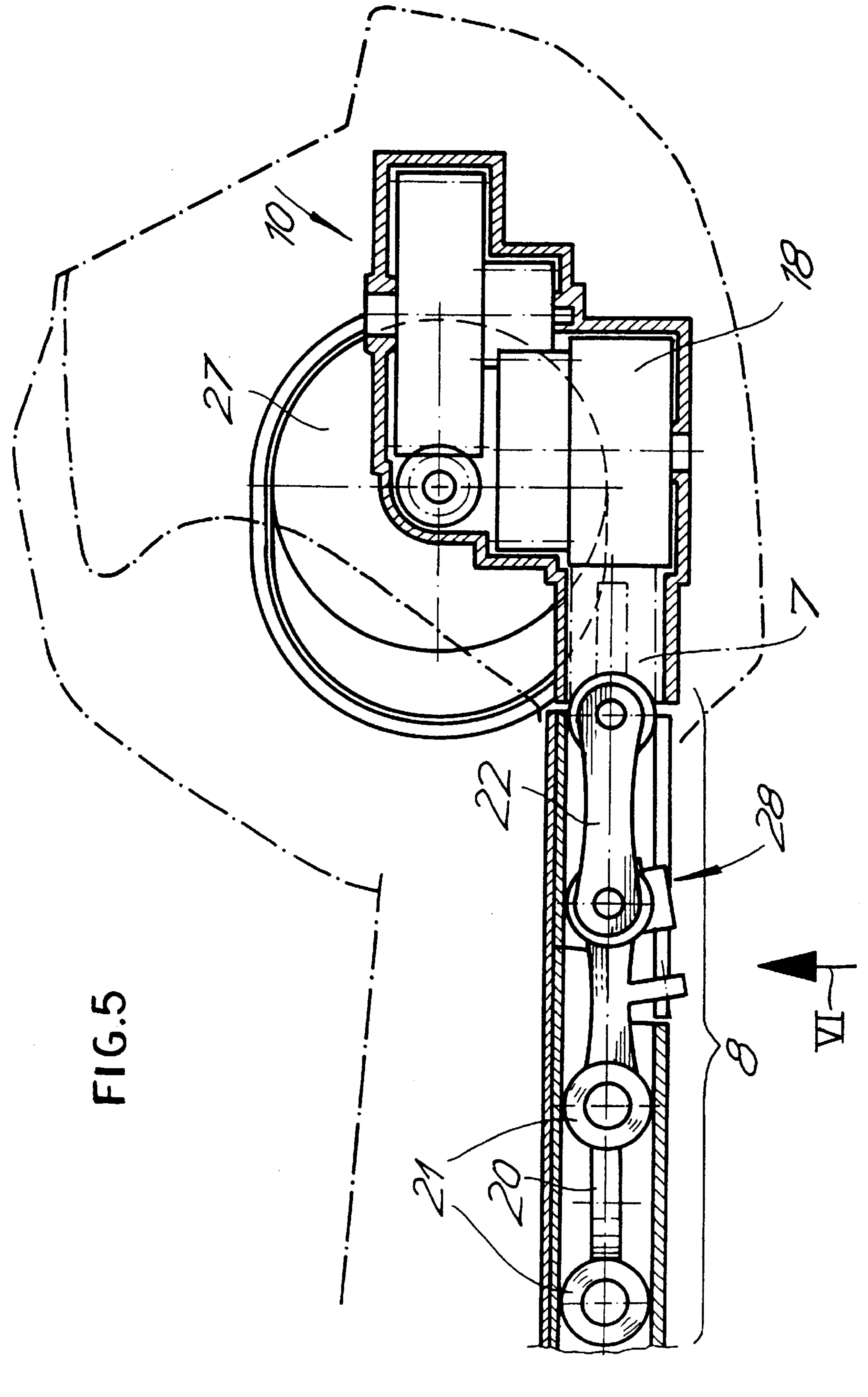
Figure 6:
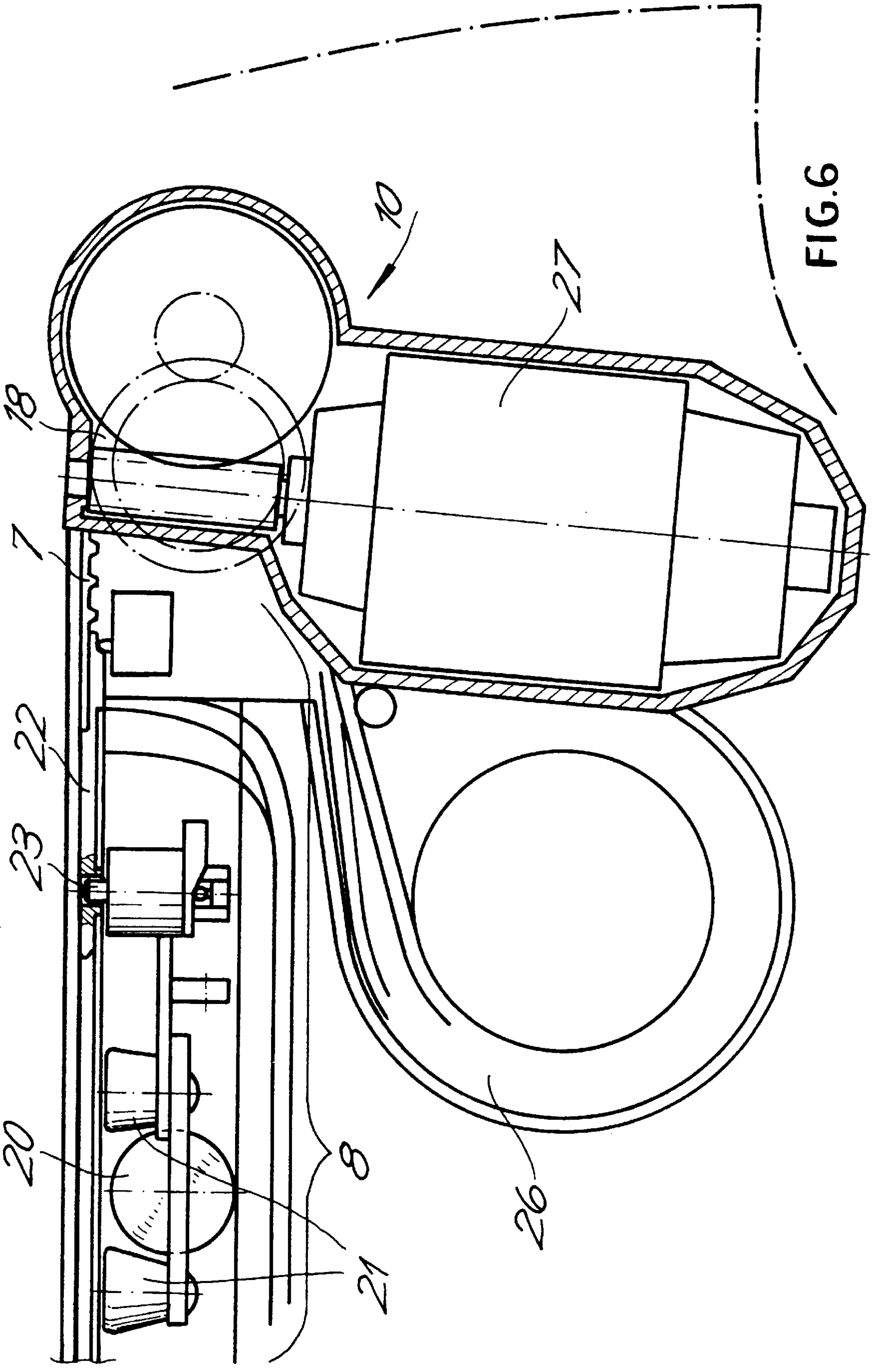
FIG. 6 is a view taken in the direction of arrow VI of FIG. 5.

As shown in FIGS. 5 and 6 the belt 7 passes around a toothed drive wheel or pulley 18 and is wound up on a spring-loaded spool 26. An electric motor 27 connected to the drive wheel 18 can therefore move the belt 7 in or out as determined by the central controller of the vehicle lock system.

Figure 7:
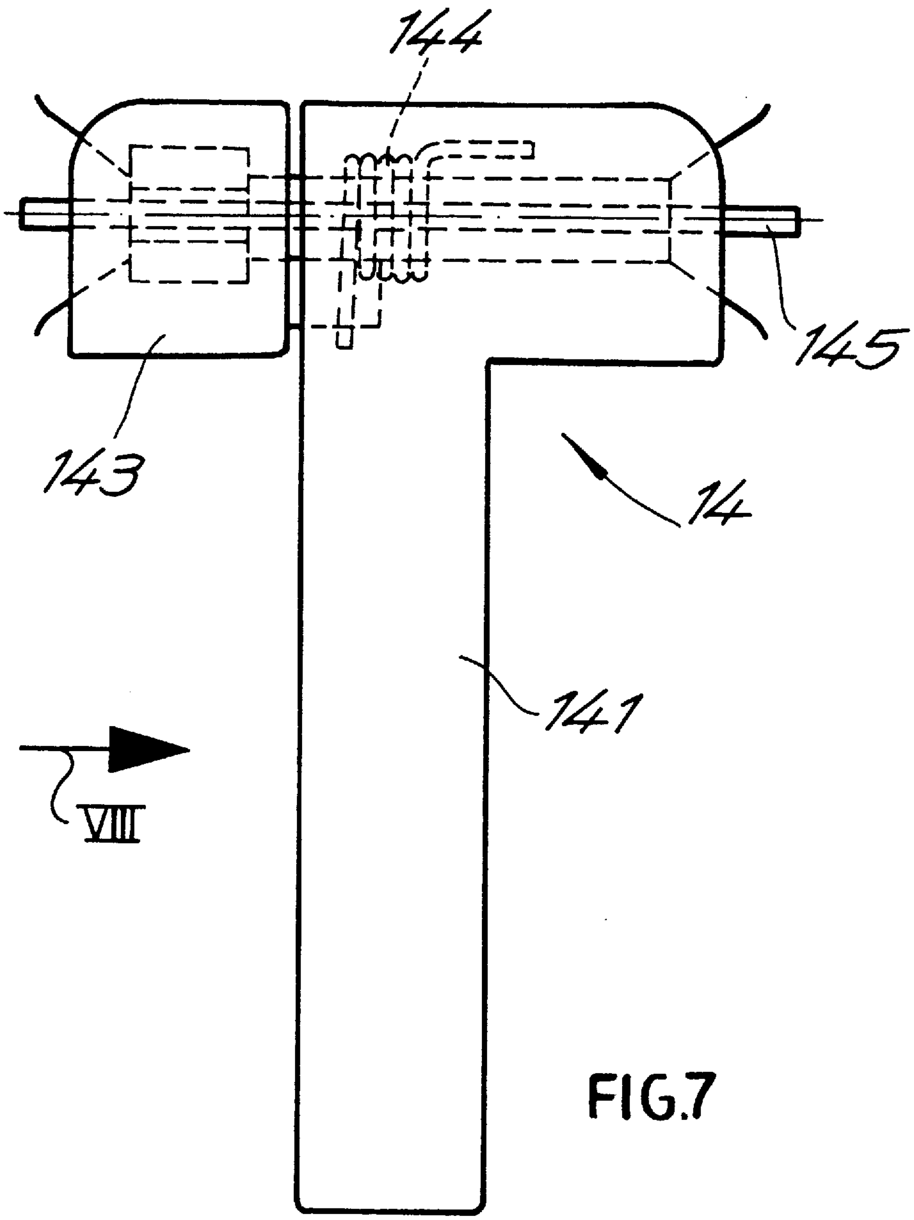
FIG. 7 is a large-scale front view of the front door-handle assembly.
Figure 8A:
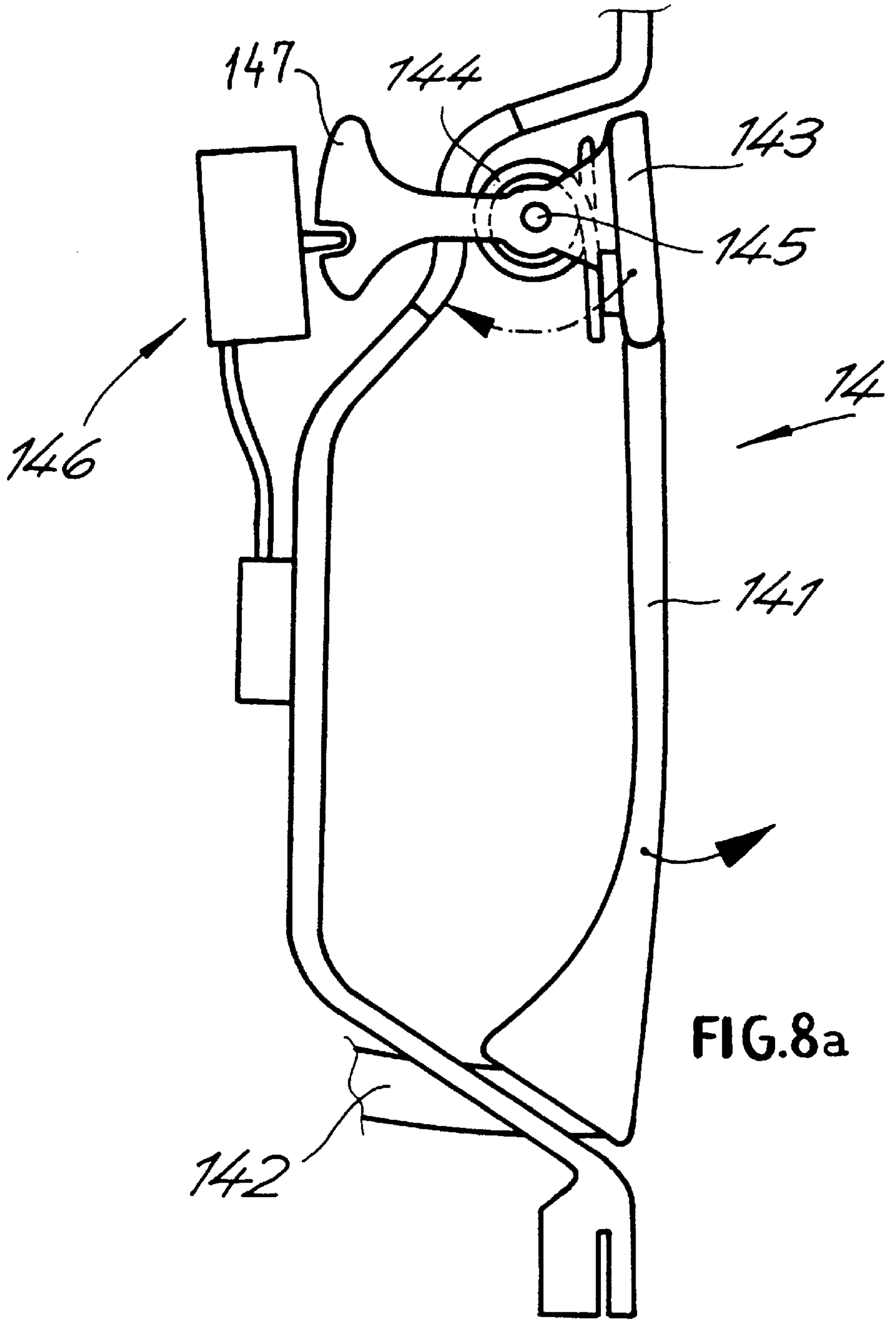
FIG. 8*a* is a view taken in the direction of arrow VIII of FIG. 7.
Figure 8B:
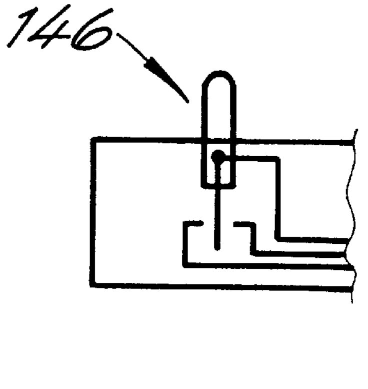
FIG. 8*b* is a schematic view illustrating a detail of FIG. 8*a;*

FIGS. 7, 8*a*, and 8*b* show how the outside handle assembly 14 comprises a basically T-shaped handle 141 pivoted on a shaft 145 and having a crosspiece part 143 linked to it by a spring 144. A link arm 142 extends from a lower end of the handle 141 to the front control latch 15. The crosspiece 143 has an arm 147 that acts on a single-pole double-throw switch 146 (see FIG. 8*b*), When the handle 141 is lifted as shown by the solid-line arrow in FIG. 8*a* it entrains the piece 143 and actuates the switch 146 in one direction to trip the door drive 10 as will be described below. If for some reason the actuator 10 does not respond, further lifting of the handle 141 will manually operate the latch 15 by means of the link arm 142.

Depression of the piece 143 in the direction of the dot-dash arrow will oppositely operate the switch 146 so that power movement of the door 1 will be stopped and/or reversed. Thus if while the door 1 is being opened by the drive 10 the piece 143 is operated, the door 1 stops. Reactuation of the piece 143 will restart the opening or closing operation.

Figure 9:
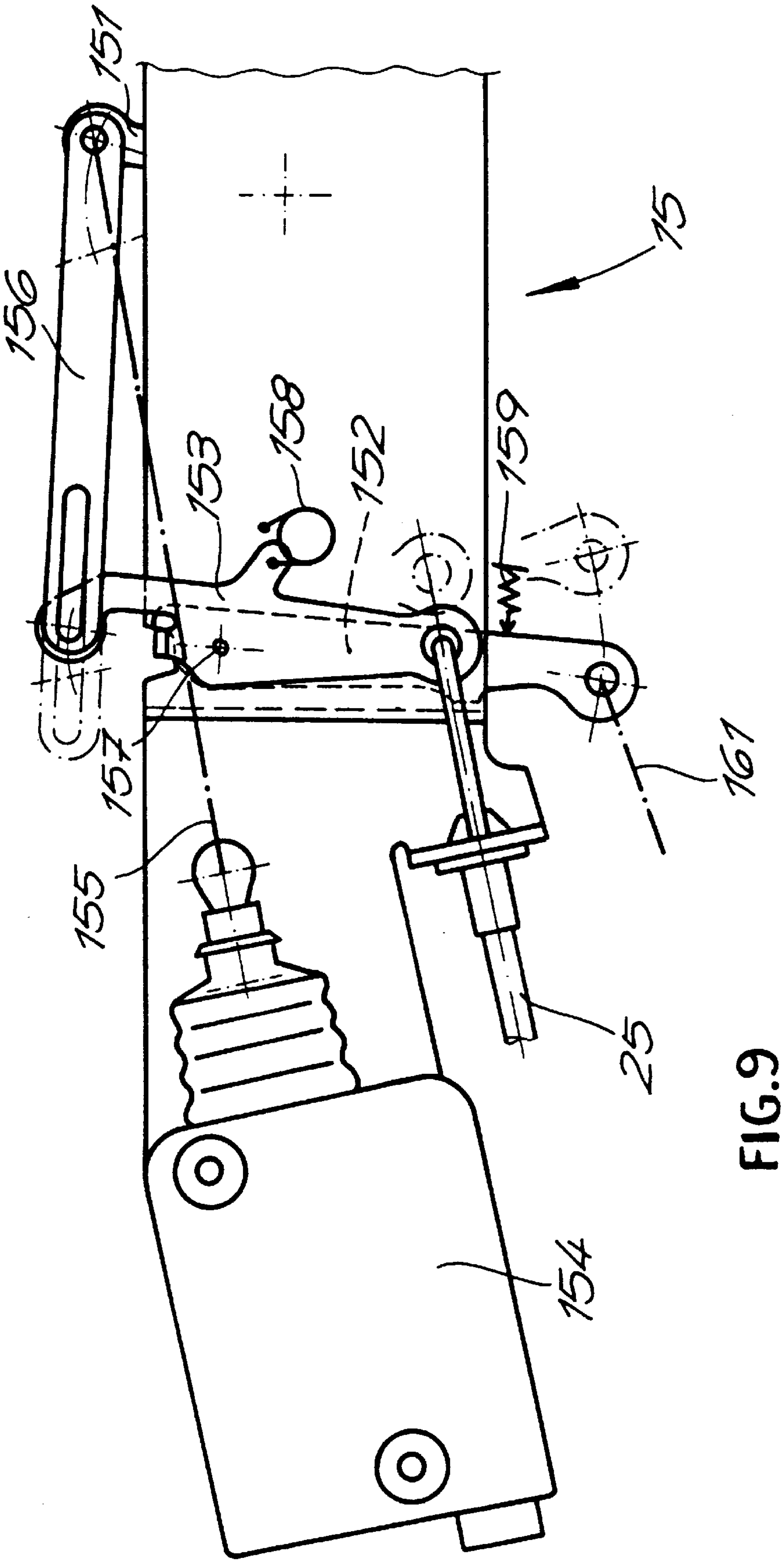
FIG. 9 is a view of elements of the front control latch.

FIG. 9 shows how the control latch 15 has a locking lever 151 that can be operated by a button or lever inside the door, by a key cylinder accessible from outside the door (e.g. by a key shown at 39 in FIG. 12), or by means of a central lock actuator 154 connected to it by a link shown schematically at 155. The latch 15 also has a main actuating lever 152 that is connected on the one side via an unillustrated link to the arm 142 of the handle assembly 14 and on the other side via a link 161 to the actuator 16 for the door latch 13.

More specifically, the arm 152 and a coupling lever 153 are pivoted at 157 on the door 1. A toggle spring 158 defines a pair of stable end positions for the lever 153 and a spring 159 urges the lever 152 into engagement with the lever 153, which position corresponds to an unactuated position of the latch 13. A slotted end link rod 156 is connected between the locking lever 151 and one end of the lever 153 and the opposite end of this lever 153 is connected to the core of the cable 25 that operates the coupling 28.

Lifting of the handle 141 will move the lever 152 into the dot-dash position of FIG. 9 which will, as described below, open the latch 13 and simultaneously open the coupling 28, allowing the door to be opened manually. For this to happen, of course, the link 156 must be in the dot-dash position; otherwise the door 1 is locked.

Figure 10:
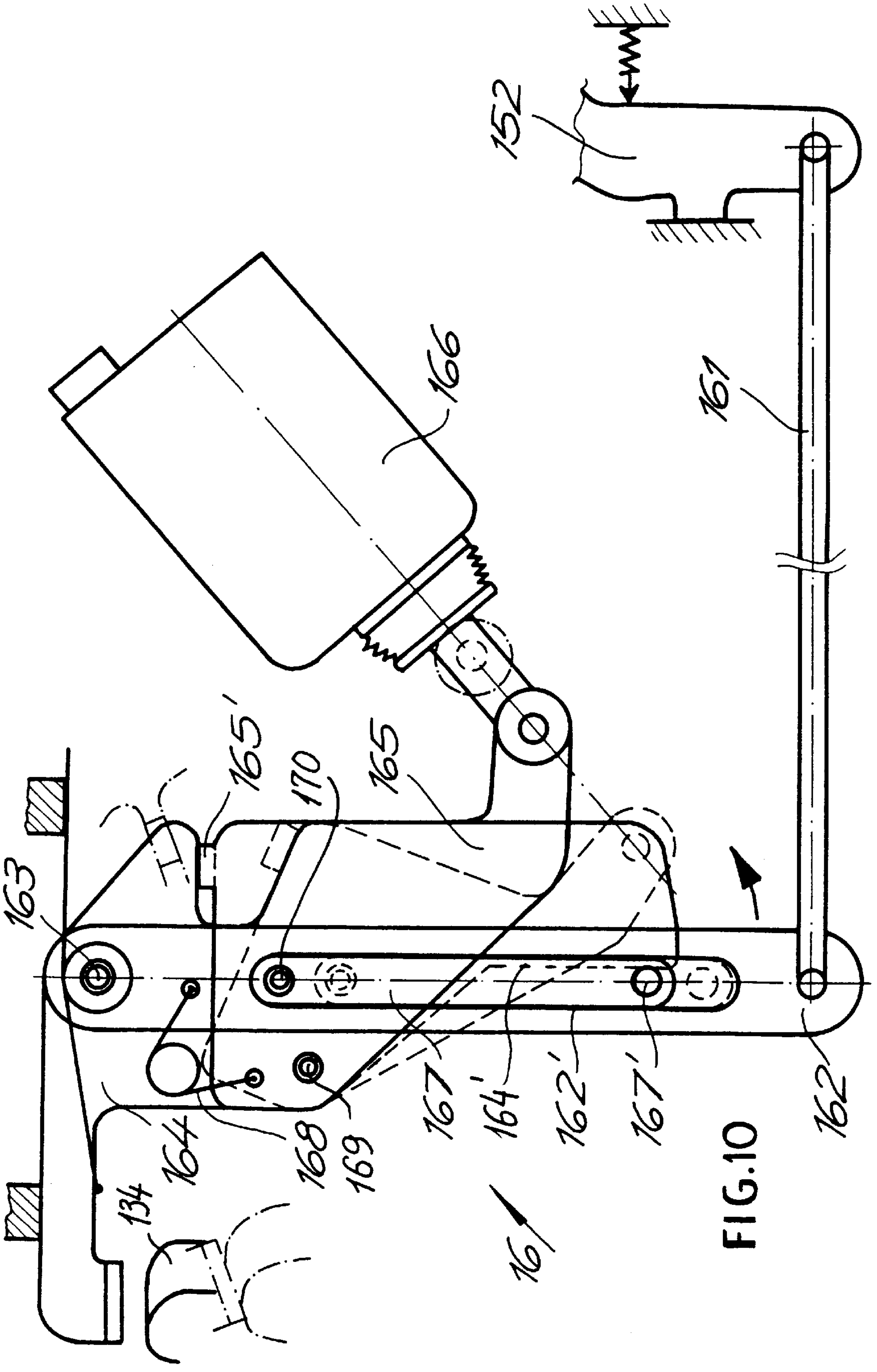
FIG. 10 is a view of the servo system.

The servo system 16 of FIG. 10 has an actuator 166 that functions to unlatch the door 1 when energized as described below. To this end a lever 162 has one end connected via the link rod 161 to the actuating lever 152 and an opposite end pivoted at 163 on the door 1. A release lever 164 is also pivoted at 163 but can move relative to the lever 162. An antitheft lever 165 is pivoted at 169 on the lever 14 and carries a pivot 170 for a link 167 having a pin 167' riding in a slot of the lever 162 and engageable with an edge 164' of the lever 164.

When the actuator 166 pulls the lever 165 up into the dot-dash position, its edge 165' abuts the lever 164 and tips same about the axis 163 to open the latch 13. Similarly if the lever 152 is operated manually, it will tip the lever 162 which will press the pin 167' against the edge 164' to tip the lever 164 and open the latch.

If, however, the actuator 166 pushes down the lever 165 it will push the link 167 down into the dashed-line antitheft position in which its pin 167' is clear of the edge 164'. In this position operation of the lever 152 will be ineffective, since the lever 162 will not be coupled by the pin 167' to the lever 164.

Figure 11B:
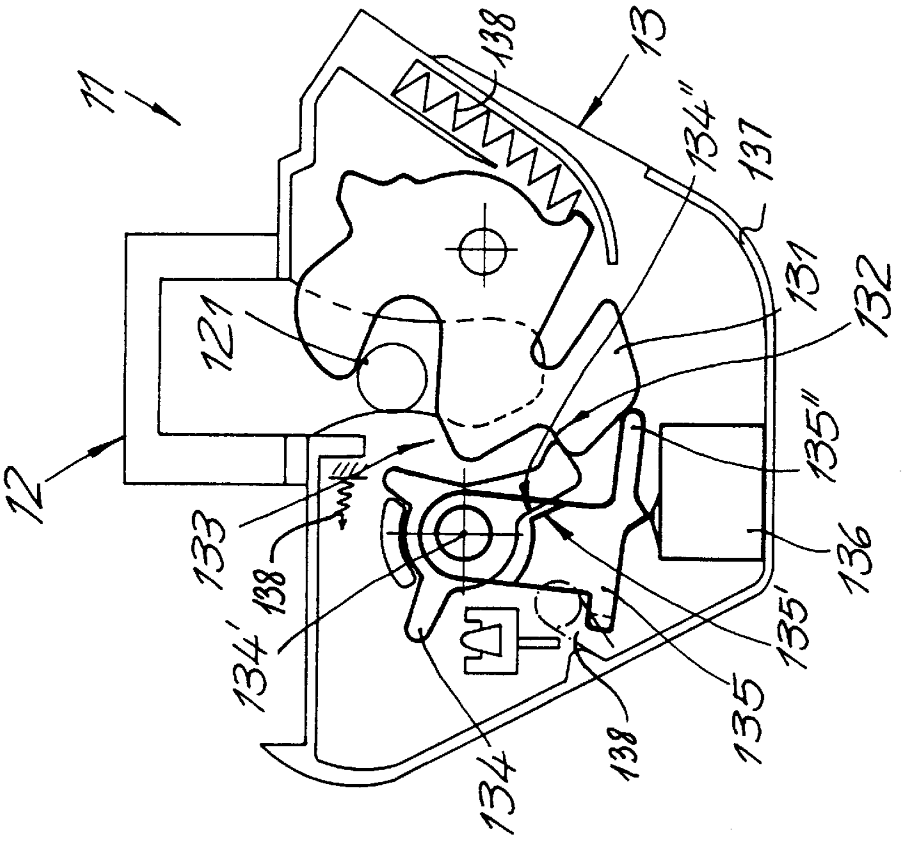
FIGS. 11*a* and 11*b* are partly diagrammatic sections through the mechanical elements of the rear door latch in the fully and semilatched positions, respectively.
Figure 11A:
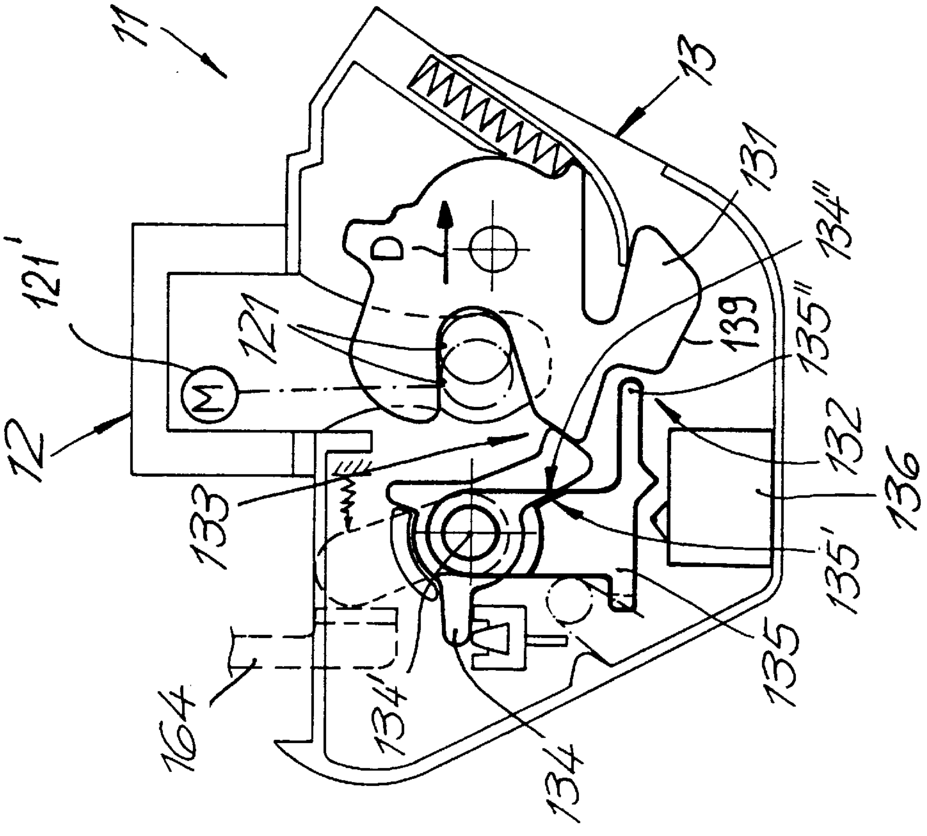

FIGS. 11*a* and 11*b* show the latch 13 and its strike or keeper 12 which basically comprises a bolt 121 that can be shifted between the two positions indicated in solid and dot-dash lines in FIG. 11*a* by a mechanism such as described in U.S. Pat. No. 5,217,266. This latch 13 comprises a housing 137 normally mounted on the edge of the door 1 and the bolt 121 which is normally mounted on a door post or the body of the vehicle 17. The bolt 121 is movable into and out of the housing 137 and a motor illustrated schematically at 121' can also displace it limitedly in this direction as shown by the solid and dot-dash positions of FIG. 11*a*.

As is standard, the latch 13 has a fork 131 pivotal about a fork axis and formed with a cutout that can engage around the bolt 121. As the bolt 121 moves into the latch the fork 131 is pivoted from an unillustrated open position to a semilatched position shown in FIG. 11*b* and into an end fully latched position shown in FIG. 11*a*. When in the fully latched position a controller 31 (FIG. 12 only) operates the motor 121' to advance the bolt 121 from the solid-line to the dot-dash position to pull the door 1 carrying the housing 137 very tightly closed.

A latch pawl 134 has an arm engageable with either of two steps 132 or 133 of the fork 131 in the semilatched and fully latched positions, respectively. When thus engaged the fork 131 is retained in the respective position. This pawl 134 is pivoted about its axis 134' by the release lever 164.

A switch lever 135 has an arm 135" engageable with an edge 139 of the fork 131 in the semilatched and open positions of the fork 131 and an edge 135" engageable with an edge 135" of the pawl 4. This lever 135 is engageable with a switch 136 connected to the controller 31. Springs 138 urge the fork 131 into the open position, the pawl 134 into the illustrated holding position, and the lever 135 into the FIG. 11*a* second position.

This system works as follows:

When the door 1 is open and the fork 131 is in the unillustrated open position, its edge 139 pushes the lever 135 down and actuates the switch 136 into a first position so that the controller 31 cannot operate the motor 121' and the bolt 121 is in its outer position.

As the door 1 is closed the fork 131 is pivoted by the bolt 121 counterclockwise first into the semilatched position of FIG. 11*b*. In this position the edge 139 continues to push down the arm 135" and push the lever 135 against the switch 136, preventing operation of the motor 121' by the controller 31 by retaining the switch 136 in the first position. In this position there is still a slight spacing between the surfaces 135' and 134" so that the pawl 134 is not acting on the switch lever 135.

With further closing of the door 1 the fork 131 is pivoted into the fully latched position of FIG. 11*a* and the arm 135" loses contact with the surface 139, so the spring 138 can pivot the lever 135 back up until the surfaces 135' and 134" abut and the lever 135 loses contact with the switch 136. This signals to the controller 31 that the motor 121' can be operated to shift the bolt 121 in the direction of arrow D and thereby pull the door very tightly closed.

When the door is to be opened by pushing of the lever 164 against the pawl 134, the surface 135' pushes against the surface 134" and moves the lever 135 down to operate the switch 136. This signals to the controller 31 to reverse the motor 121' and back off the bolt 121, while at the same time the pawl 134 releases the fork 131 so the bolt 121 can move out of the latch and the fork 131 can assume the open position.

Figure 12:
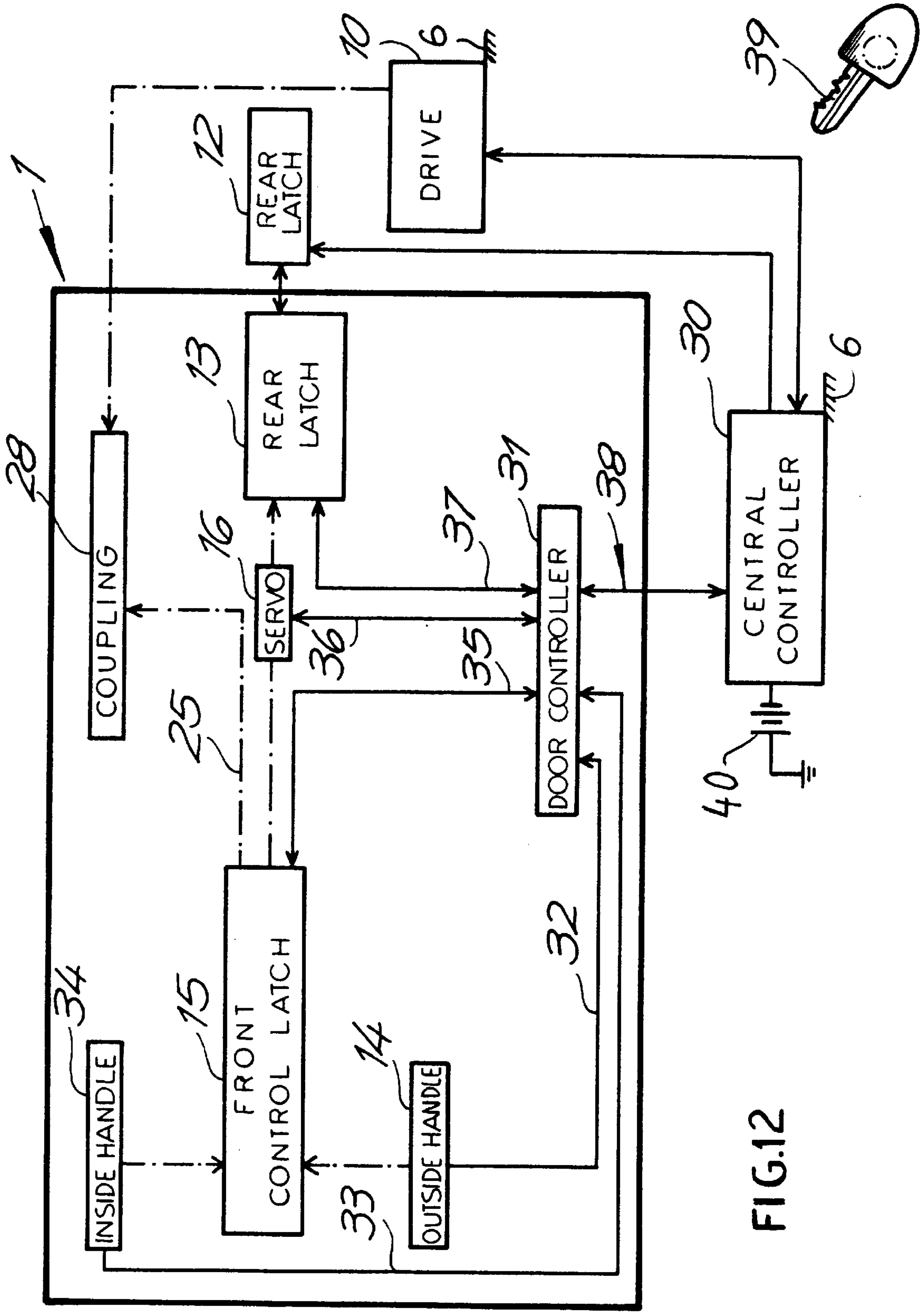
FIG. 12 is a schematic diagram illustrating the system of this invention.

FIG. 12 shows the connections between the various sub-systems of the invention, the electrical connections being shown in solid lines and the mechanical ones in dot-dash lines. The parts in the door 1 are enclosed in a thick-line rectangle and the other parts are mounted in the body of the vehicle 17.

A main central controller 30 is powered by the vehicle battery 40 and is connected via a coupling 38 to the door controller 31. This coupling 38 can be a flexible multiconductor cable. Alternately it can be contacts on the door 1 and on the vehicle body that are only engaged together when the door is closed and short-range transmitters and receivers on the door and body that pass back control signals. When the door is open it is powered by its own battery and communicates with the controller 30 via this short-range radio link 38.

The door controller 31 is connected via a line 32 with the switch 146 of the handle assembly 14 and via another such line 33 with a corresponding switch of the inside handle assembly 34. These lines 32 and 33 keep the controller 31 informed of the conditions of the respective handles and serve to trip the opening movement effected by the front control latch. A line 35 inhibits operation of the front control latch 15 when a child-safety setting is in the on position, so as to disable the inside door handle 34. In addition the controller 31 is connected via a line 36 with the actuator 166 of the servo 16 and via a line 37 with the switch 136 of the latch 13.

We claim:

1. In a motor vehicle having a body provided with at least one generally horizontal rail having a bent end portion and along which a sliding door is displaceable between a closed position in against the body and an open position out from the body, a sliding-door assembly comprising:

- a door actuator on the body including
  - a flexible toothed belt extending along the rail and having an end,
  - a link assembly fixed to the door, riding along the rail, connected to the belt end, and engaged in the bent end portion of the rail in the closed position of the door,
  - a guide extending along the rail and laterally confining the belt, and
  - actuator means on the body for displacing the belt in one sense and thereby tensioning the belt and moving the door in one direction and displacing the belt in the opposite sense and thereby longitudinally compressing the belt and moving the door in the opposite direction;
- means including a door latch on the door and a keeper on the body communicating therewith for securing the door tightly to the body in the closed position of the door and a closed position of the latch and for releasing the door to ride along the rail in an open position of the latch; and
- control means connected between the door latch and the door actuator for operating the actuator means to move the door into the respective open position on displacement of the latch into the respective open position.

2. The motor-vehicle sliding-door assembly defined in claim 1 wherein the vehicle has an upper rail, a lower rail, and a middle rail therebetween, the belt extending along the middle rail.

3. The motor-vehicle sliding-door assembly defined in claim 1 wherein the actuator means includes a rotating toothed drive pulley over which the belt is spanned.

4. The motor-vehicle sliding-door assembly defined in claim 1, further comprising

- remotely operable coupling means between the link assembly and the belt displaceable between a coupling position securing the belt to the link assembly and a decoupling position freeing the belt from the link assembly.

5. The motor-vehicle sliding-door assembly defined in claim 1 wherein the keeper on the body is provided with an actuator for displacing it transversely of the rail and thereby pulling the door tightly against the vehicle.

6. The motor-vehicle sliding-door assembly defined in claim 1 wherein the control means is mounted on the body and connected via wiring to the actuator means.

7. The motor-vehicle sliding-door assembly defined in claim 1 wherein the control means includes a controller mounted in the door and connected via wiring to the door latch.

8. The motor-vehicle sliding-door assembly defined in claim 1 wherein the control means includes a controller mounted on the body and a controller mounted in the door and is provided with means for communicating between the controllers at least in the open position of the door.

* * * * *